US010298434B2

(12) United States Patent
Manolakos et al.

(10) Patent No.: US 10,298,434 B2
(45) Date of Patent: May 21, 2019

(54) COMPRESSED MODULATION FEEDBACK IN CODEWORD TRANSMISSION WITH PER-LAYER-MODULATION MAPPING

(71) Applicant: QUALCOMM Incorporated, San Diego, CA (US)

(72) Inventors: Alexandros Manolakos, San Diego, CA (US); Jing Jiang, San Diego, CA (US); Joseph Binamira Soriaga, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/899,351

(22) Filed: Feb. 19, 2018

(65) Prior Publication Data

US 2018/0262382 A1 Sep. 13, 2018

Related U.S. Application Data

(60) Provisional application No. 62/469,205, filed on Mar. 9, 2017.

(51) Int. Cl.
*H04L 27/34* (2006.01)
*H04L 1/00* (2006.01)
(Continued)

(52) U.S. Cl.
CPC ....... *H04L 27/3488* (2013.01); *H04B 7/0456* (2013.01); *H04L 1/0001* (2013.01); *H04L 1/0003* (2013.01); *H04L 1/0033* (2013.01); *H04L 27/0008* (2013.01); *H04L 27/2646* (2013.01)

(58) Field of Classification Search
CPC . H04L 27/3488; H04L 1/0001; H04L 1/0033; H04L 27/0008; H04L 27/2646; H04L 1/0003; H04B 7/0456
See application file for complete search history.

(56) References Cited

U.S. PATENT DOCUMENTS

2007/0110002 A1* 5/2007 Yang .................... H04L 1/0003
370/335
2010/0202561 A1 8/2010 Gorokhov et al.
(Continued)

OTHER PUBLICATIONS

International Search Report and Written Opinion—PCT/US2018/018792—ISA/EPO—dated May 29, 2018.
(Continued)

*Primary Examiner* — Dac V Ha
(74) *Attorney, Agent, or Firm* — Linda G. Gunderson; Norton Rose Fulbright

(57) ABSTRACT

Compressed modulation feedback in codeword transmission with per-layer-modulation mapping is discussed. In the proposed compression schemes, the number of bits of feedback is compressed by excluding some of the allowed combinations of per-layer modulation orders. The excluded combinations are determined according to a fixed index delta, which prohibits any one modulation scheme being selected that has an index difference greater than the fixed index delta. The transmitting entity may then send per-layer modulation parameters, which may be the actual modulation orders identified or some relative parameter.

30 Claims, 7 Drawing Sheets

(51) Int. Cl.
  *H04B 7/0456* (2017.01)
  *H04L 27/26* (2006.01)
  *H04L 27/00* (2006.01)

(56) References Cited

U.S. PATENT DOCUMENTS

| | | | |
|---|---|---|---|
| 2010/0271988 A1 | 10/2010 | Jia et al. | |
| 2015/0304065 A1* | 10/2015 | Werner | H04L 5/0039 398/58 |
| 2016/0036618 A1* | 2/2016 | Einhaus | H04L 1/0003 370/329 |

OTHER PUBLICATIONS

ZTE: "On Number of Codewords for NR," 3GPP TSG RAN WG1 Meeting #88, R1-1701790, vol. RAN WG1, No. Athens, Greece; F-06921, Feb. 13, 2017-Feb. 17, 2017, Feb. 12, 2017, XP051208956, Retrieved from the Internet: URL: http://www.3gpp.org/ftp/Meetings_3GPP_SYNC/RAN1/Docs/ [retrieved on Feb. 12, 2017].

* cited by examiner

COMPRESSED MODULATION FEEDBACK IN CODEWORD TRANSMISSION WITH PER-LAYER-MODULATION MAPPING

CROSS-REFERENCE TO RELATED APPLICATIONS

This application claims the benefit of U.S. Provisional Patent Application No. 62/469,205, entitled, "COMPRESSED MODULATION FEEDBACK IN CODEWORD TRANSMISSION WITH PER-LAYER-MODULATION MAPPING," filed on Mar. 9, 2017, which is expressly incorporated by reference herein in its entirety.

BACKGROUND

Field

Aspects of the present disclosure relate generally to wireless communication systems, and more particularly, to compressed modulation feedback in codeword with per-layer-modulation mapping.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes identifying, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers, and transmitting, by the transmitter, per-layer modulation parameters to a receiver based on the preferred per-layer modulation order identified for each layer of the plurality of layers.

In an additional aspect of the disclosure, an apparatus configured for wireless communications includes means for identifying, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers, and means for transmitting, by the transmitter, per-layer modulation parameters to a receiver based on the preferred per-layer modulation order identified for each layer of the plurality of layers.

In an additional aspect of the disclosure, a non-transitory computer-readable medium having program code recorded thereon. The program code further includes code to identify, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers, and code to transmit, by the transmitter, per-layer modulation parameters to a receiver based on the preferred per-layer modulation order identified for each layer of the plurality of layers.

In an additional aspect of the disclosure, an apparatus configured for wireless communication is disclosed. The apparatus includes at least one processor, and a memory coupled to the processor. The processor is configured to identify, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers, and to transmit, by the transmitter, per-layer modulation parameters to a receiver based on the preferred per-layer modulation order identified for each layer of the plurality of layers.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
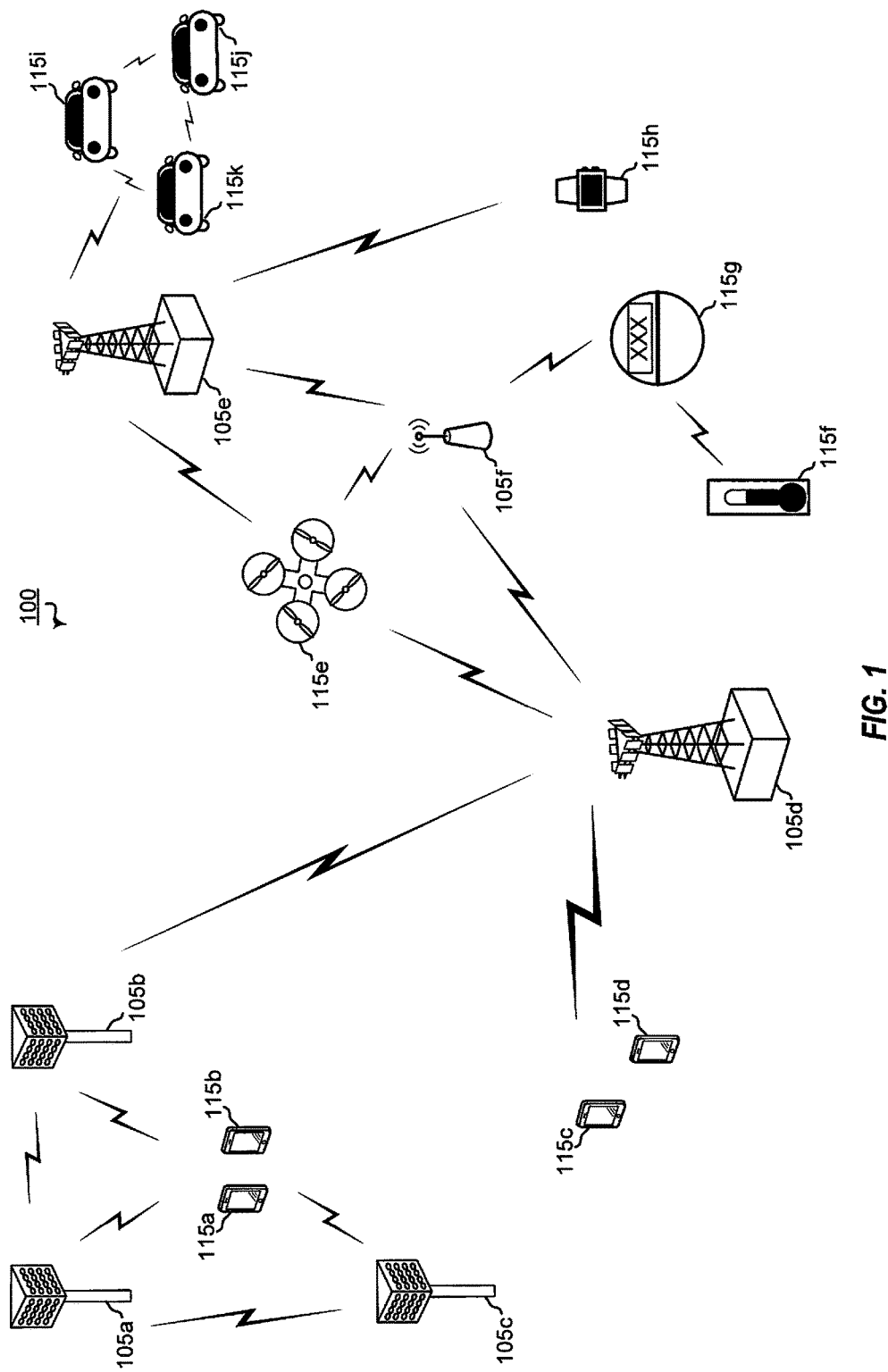
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (III); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be. a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as interne of everything (IoE) devices. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
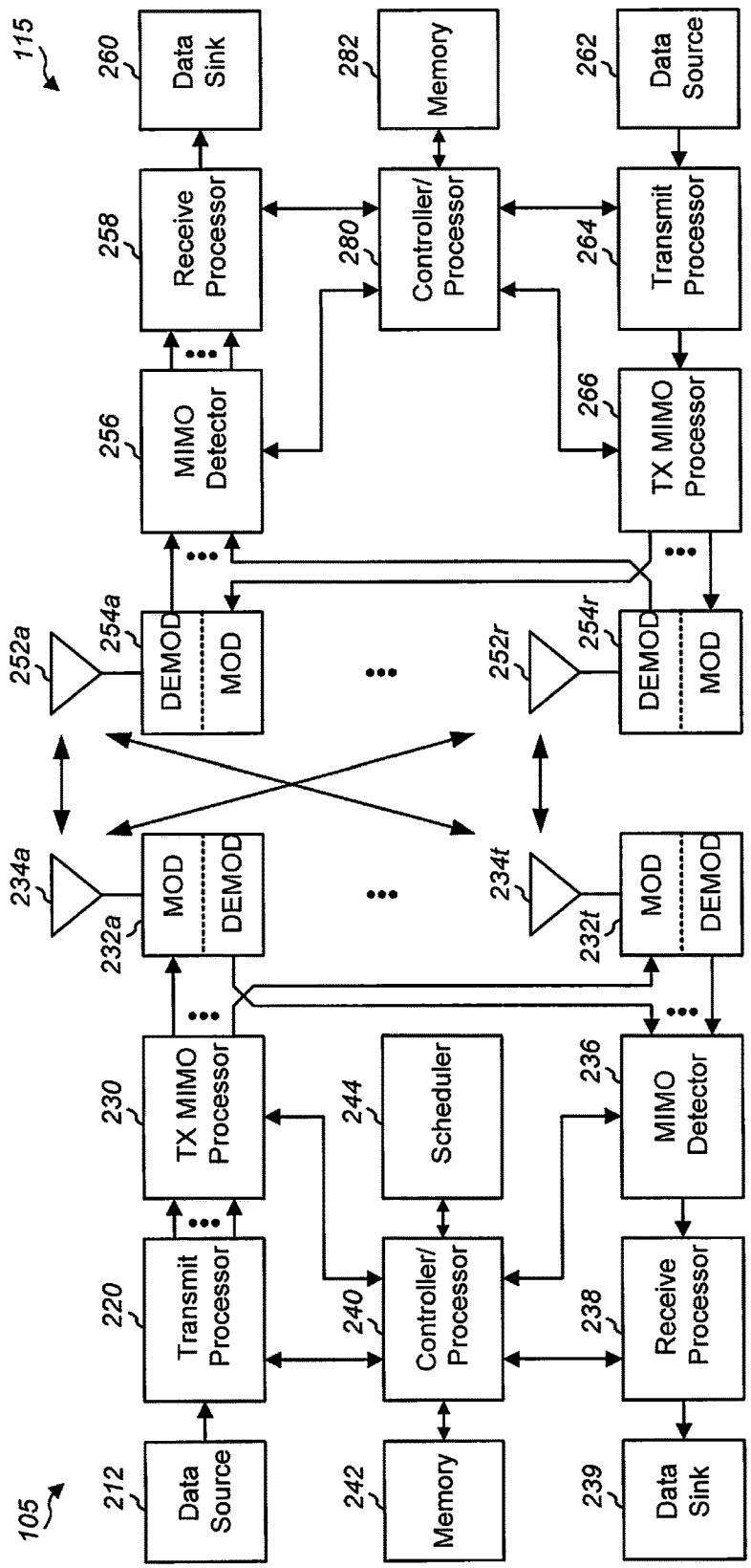
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources.

Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
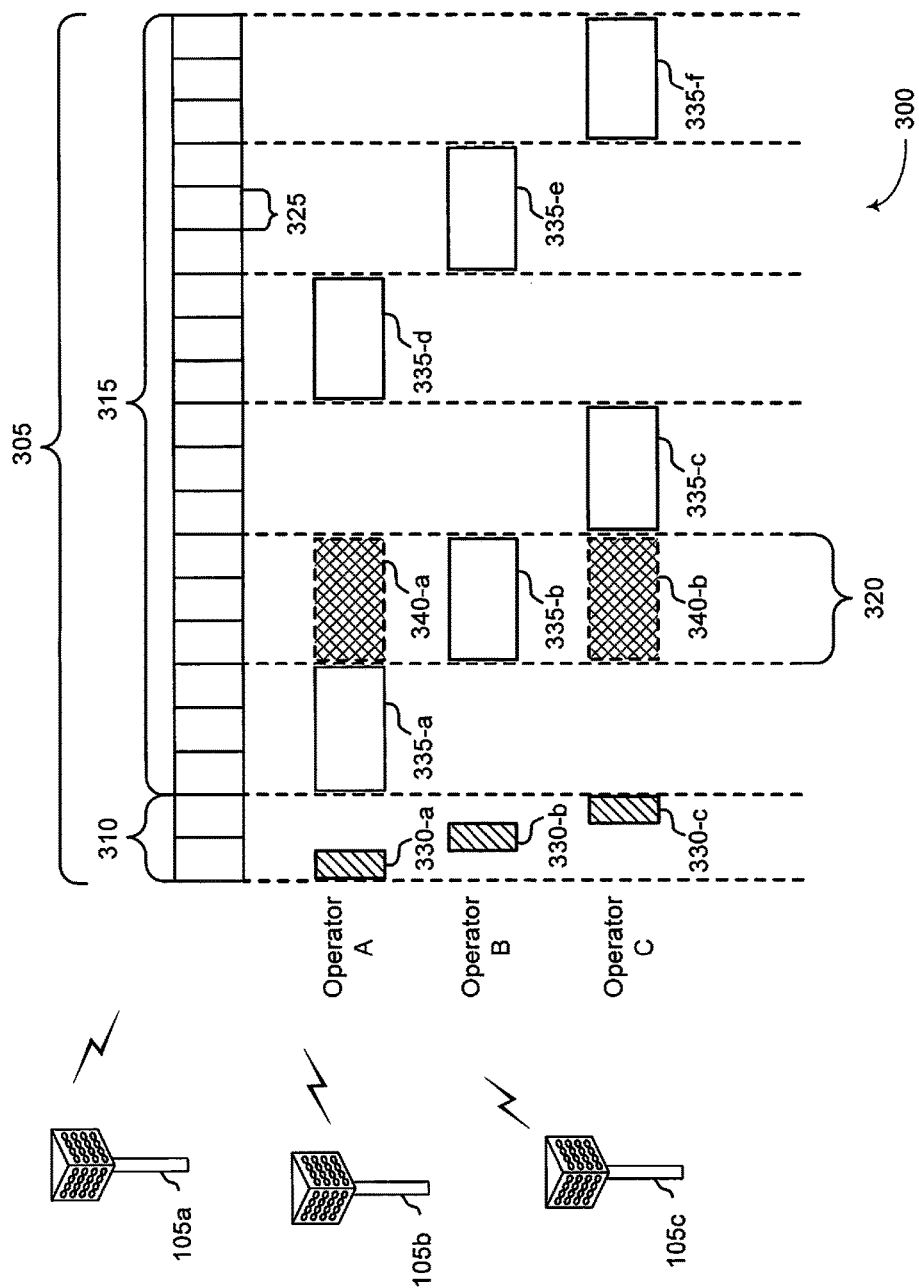
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Spatial multiplexing is a multiple input, multiple output (MIMO) operation technique that generates one or more spatial layers on which multiple data streams can be transmitted in parallel. Those data streams can be either separately or jointly coded before the spatial multiplexing. In one example operation, multiple transport blocks are individually coded, modulated, and mapped into separate codewords on a corresponding layer. This style of operation is referred to as multi-codeword (MCW) transmissions. In contrast, another example operation, a single transport block is coded and modulated into a single codeword, which is then mapped onto multiple spatial layers. This style of operation is referred to as single codeword (SCW) transmissions.

Figure 4A:
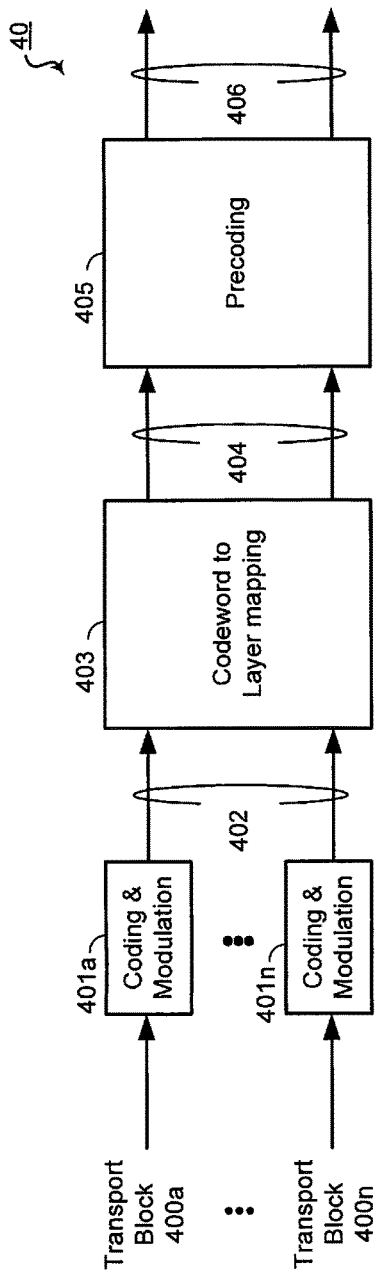
FIGS. 4A and 4B are block diagrams illustrating transmitters configured for MCW and SCW transmissions, respectively.
Figure 4B:
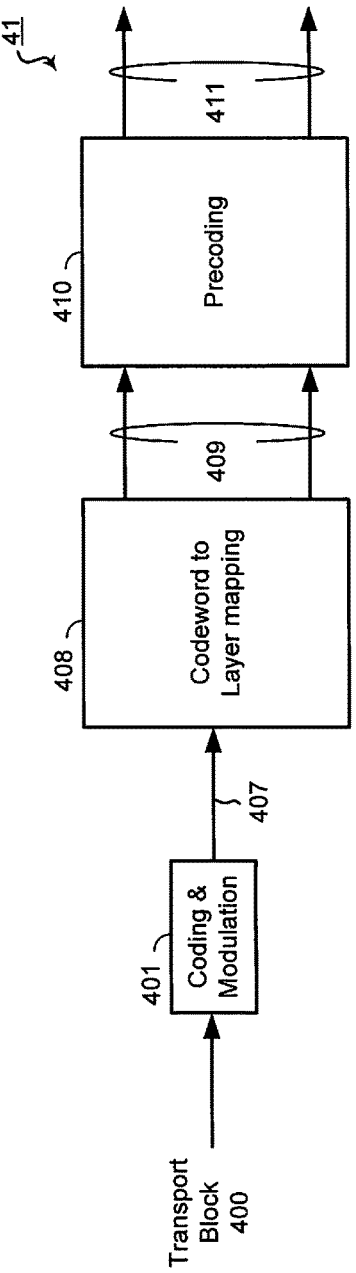

FIGS. 4A and 4B are block diagrams illustrating transmitters 40 and 41 configured for MCW and SCW transmissions, respectively. At transmitter 40, multiple transport blocks 400a-400n are individually coded and modulated at 401a-401n into corresponding multiple codewords 402. Each of multiple codewords 402 is then mapped to a separate layer via codeword to layer mapping 403, such that all of the quadrature amplitude multiplexed (QAM) symbols for a given codeword are mapped to the same layer of multiple layers 404 scheduled for transmission. Codewords 402, which have been mapped to layers 404 may then be precoded at precoder 405 for transmission by a corresponding one of antenna ports 406. Thus, each transmission stream of this MCW transmission will include bits of a different codeword/transport block.

At transmitter 41, single transport block 400 is coded and modulated at 401 into a single codeword 407. Single codeword 407 may then be mapped to each layer of scheduled layers 409 via mapping 408. Thus, the encoded bits for codeword 407 are found on each of layers 409, creating a spatial diversity in the transmission. The spatial diversity of such SCW transmissions allows for more reliable receiving of the transmission, as, when conditions for one of the layers may prevent accurate decoding by the receiver, the bits from the single codeword are still in the other layers. Codeword 407 mapped to layers 409 may then be precoded at precoder 410 and transmitted on corresponding antenna ports 411.

LTE systems did not adopt either the SCW (one codeword to all layer mapping) transmission scheme or MCW (one-to-one codeword-to-layer mapping) transmission scheme. Instead, a hybrid, middle-option was selected, whereby at most two codewords are used, even when more than two layers are scheduled for transmission. In LTE networks, the same control signalling (e.g., modulation and coding scheme (MCS), uplink control indicator (UCI), rank indicator (RI), etc.) is used for the same codeword, which may contain multiple code blocks, even when a codeword is mapped to multiple layers.

New transmission schemes have been proposed that use SCW transmissions with different modulation for different layers. Thus, while the same code rate may be used for encoding the transport block into the codeword that is mapped to multiple layers, a different modulation order can be applied to each layer. The various aspects of the present disclosure provide for specific mechanisms for compressing per-layer modulation information that is signaled between the UE and the serving base station in such a per-codeword encoding and per-layer modulation system.

A transmitter may transmit two codewords, in which each codeword is mapped through multiple layers (e.g., 2, 4) in a SCW-like manner. For example, if each codeword is transmitted through 4 layers, the two codewords will be transmitted over a total of 8 spatial layers. In such case, the per-layer modulation for each codeword may be performed, encoded, and signaled independently. Thus, while multiple codewords are being transmitted, the per-layer modulation of each codeword may be handled separately and independently or may be handled jointly.

Figure 5:
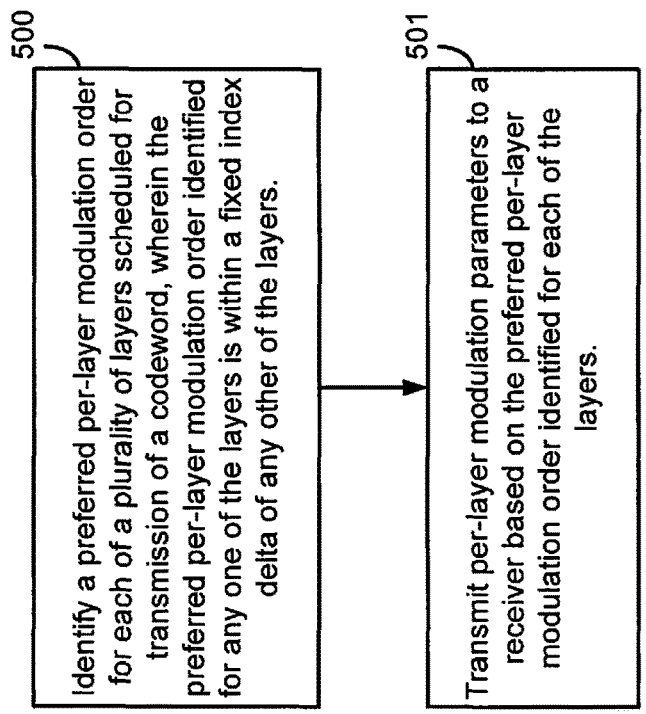
FIG. 5 is a block diagram illustrating example blocks executed to implement one aspect of the present disclosure.
Figure 6:
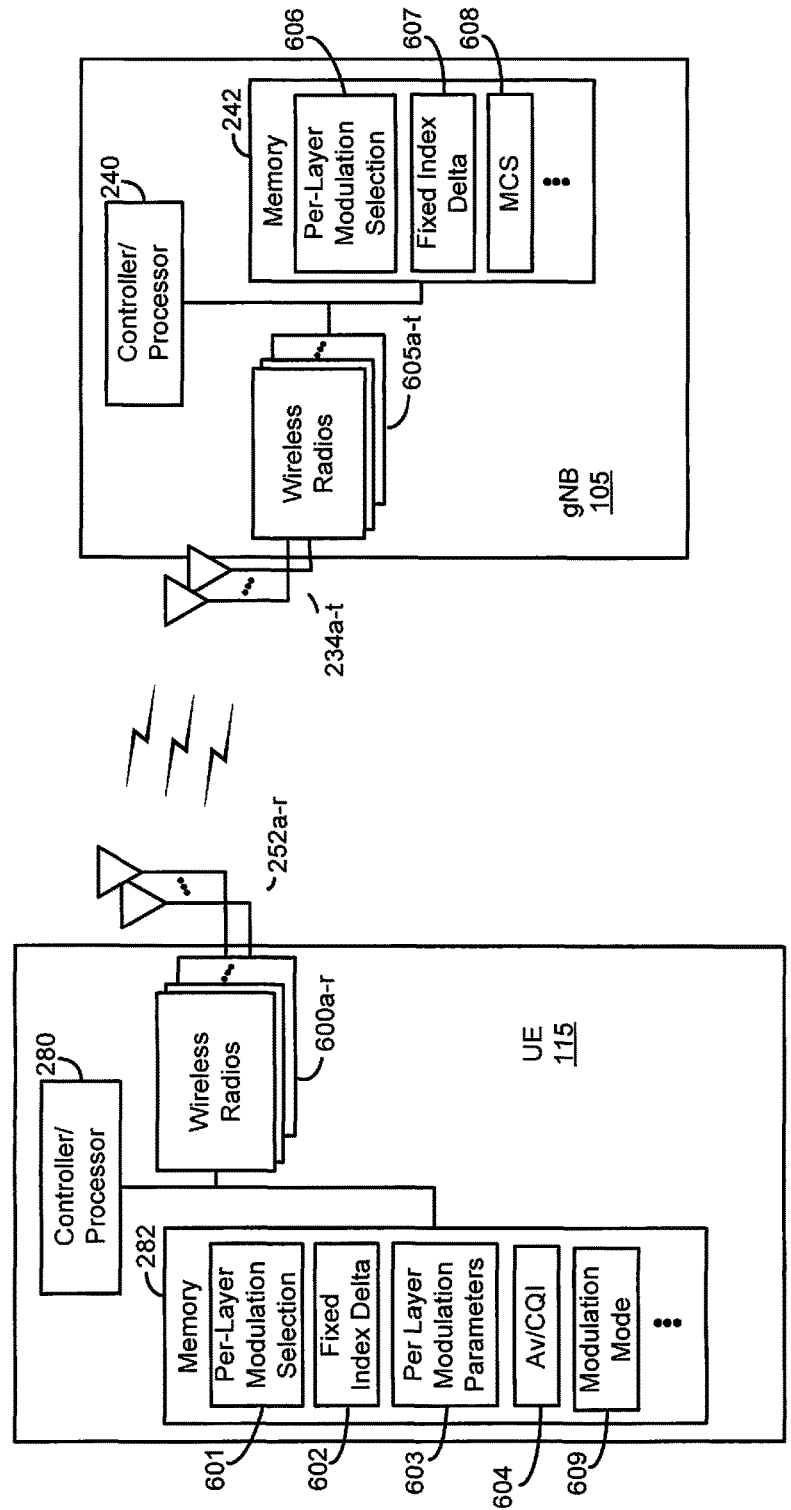
FIG. 6 is a block diagram illustrating a transmitter and a receiver according to various aspects of the present disclosure.

FIG. 5 is a block diagram illustrating example blocks executed to implement one aspect of the present disclosure. The example blocks will also be described with respect to UE 115 as illustrated in FIG. 6. FIG. 6 is a block diagram illustrating UE 115 and gNB 105 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 600a-r and antennas 252a-r. Wireless radios 600a-r includes various components and hardware, as illustrated in FIG. 2 for UE 115, including modulator/demodulators 254a-r, MIMO detector 256, receive processor 258, transmit processor 264, and TX MIMO processor 266. It is envisioned that the process of FIG. 5 may be carried out by a network entity, such as a base station or a UE as described above, such as UE 115 of FIGS. 2 and 6.

At block 500, a transmitter identifies a preferred per-layer modulation order for each of a plurality of layers scheduled for transmission of a codeword, wherein the preferred per-layer modulation order identified for any one of the layers is within a fixed index delta of any other of the layers. In considering the various available modulation schemes, there may be quadrature phase shift keying (QPSK), 16-quadrature amplitude modulation (QAM), 64-QAM, 256-QAM, and even 1024-QAM. For purposes of this application, the available modulation schemes are logically indexed, such as 0, 1, 2, 3, or 4, depending on how many of the modulation schemes are available for the wireless system. The fixed index delta means the positional difference, in absolute value, between the modulation orders according to their index. Thus, if QPSK, 16-QAM, 64-QAM, and 256-QAM are used in a particular network and logically indexed 0 (QPSK), 1 (16-QAM), 2 (64-QAM), 3 (256-QAM), the index difference between QPSK and 64-QAM is 2 (|0−2|=2), while the index difference between 256-QAM and QPSK is 3 (|3−0|=3). The fixed index delta, which may be stored by UE 115 (FIG. 6) in memory 282 at fixed index delta 602, provides a bounding to the index difference that may occur in a selection of preferred per-layer modulation order. For example, with a fixed index delta of 2, the modulation orders for consecutive layers could not be QPSK to 256-QAM. Instead, the available modulation orders are compressed to only those with the index difference of 2 or less. UE 115 may have the fixed index delta stored in memory 282 by the hardware manufacturer or network operator, or may receive it in a semi-static or dynamic signaling via a base station, such as gNB 105.

In order to identify the preferred per-layer modulation order, UE 115, under control of controller/processor 280, would execute per-layer modulation selection logic 601, stored in memory 282. The execution environment of per-layer modulation selection logic 601 analyzes the relative signal strength of the different available layers and determines which modulation scheme available would be preferred. The selection uses the fixed index delta, stored at fixed index delta 602, when making its preferred selections.

At block 501, the transmitter transmits per-layer modulation parameters to a receiver based on the preferred per-layer modulation orders identified for each of the multiple layers. The feedback of the per-layer modulation parameters assists a base station or gNB to select the specific per-layer modulation scheme for a served UE, such as UE 115. After selecting the preferred per-layer modulation orders in the execution environment of per-layer modulation selection logic 601, UE 115 may determine the parameters to send to gNB 105 using per-layer modulation parameters 603. Per-layer modulation parameters 603 may include the actual preferred per-layer modulation order identified by the transmitter, or may include a relational parameter, such as a difference parameter or modulation scheme transition point, or the like. When used in combination with an agreed ordering of the modulation order and an average channel quality indicator (CQI) determined by average CQI generator 604, stored in memory 282, at UE 115, UE 115 may determine which modulation order is preferred for each layer indirectly. UE 115 may then transmit the per-layer modulation parameters to gNB 105 via wireless radios 600a-r and antennas 252a-r. These per layer modulation parameters may then be used by the receiver for actual selection of the control signaling, such as MCS, etc., for each schedule layer of the transmitter.

The preferred per-layer modulation orders communicated by UE 115 to gNB 105 may be communicated along with other channel state information, such that the gNB 105 may take into account the per-layer modulation order that UE 115 prefers for each of its multiple layers scheduled for transmission of a codeword when assigning the actual per-layer modulation order via control signaling, such as MCS, and the like.

It should be noted that such per-layer modulation parameters may also be provided by a base station or gNB to a UE for additional information regarding the per-layer modulation of communications between the base station and UE. Thus, the example blocks may also be described with respect to gNB 105 as illustrated in FIG. 6. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 605a-t and antennas 234a-t. Wireless radios 605a-t includes various components and hardware, as illustrated in FIG. 2 for eNB 105, including modulator/demodulators 232a-t, MIMO detector 236, receive processor 238, transmit processor 220, and TX MIMO processor 230.

When the receiver is a base station, such as gNB 105, it may receive the per-layer modulation parameters from the transmitter UE via antennas 234a-t and wireless radios 605a-t, and determine the appropriate per-layer modulation order for each layer scheduled for the UE transmission. gNB 105 would then transmit a specific MCS, from MCS generator 608, stored in memory 242 and executed under control of controller/processor 240, that allows UE 115 to select the particular modulation order for each of its scheduled layers.

When the receiver is operating from gNB 105, gNB 105 would execute per-layer modulation selection logic 606, stored in memory 242, under control of controller/processor 240 to select the preferred per-layer modulation scheme for each of the layers. gNB 105 would use the bounding limit of fixed index delta 607, to compress the per-layer modulation signals by dropping the transitions that have an index difference greater than the fixed index delta.

In a first operational mode, the transmitter may send the per-layer modulation parameters as the actual per-layer modulation identified as preferred for each layer. Consider the case of four modulation orders, e.g., QPSK, 16-QAM, 64-QAM, 256-QAM. A logical ordering may be applied to these modulation order with the indices: 0, 1, 2, 3, respectively. Similar results may be achieved when five modulation orders are used, such as by adding 1024-QAM, in which cases the logical indices would be 0, 1, 2, 3, 4. The transmitter will jointly encode the signaling feedback in such a way that the reported modulation orders are either equal to or differ by only one modulation order level. In this described example, the fixed index delta may be 1. Thus, the feedback of identified preferred per-layer modulation orders may not include those with a difference of greater than 1. The UE may then feed back this compressed/quantized modulation parameter information.

It should be noted that if the preferred choice of modulation orders actually would differ by more than the fixed index delta, here one, then the identified preferred modulation order would be bounded by a maximum index difference of one.

In one example implementation, if the UE computes that 2 layers should use M0=QPSK and M1=64-QAM respectively, an actual difference of −2 (0−2=−2), it will only report back that M0−M1 =−1. Assuming the above rule, if the UE reports M0 and M1, the reported values would fall within all possible jointly-encoded values as shown in Table 1 below.

TABLE 1

| M0 | 0 | 0 | 1 | 1 | 1 | 2 | 2 | 2 | 3 | 3 |
|---|---|---|---|---|---|---|---|---|---|---|
| Δ-M1 | 0 | 1 | −1 | 0 | 1 | −1 | 0 | 1 | −1 | 0 |

It can be observed that there is no need to have a value of Δ−M1=1 when M0 is 3, since that would exceed the current fixed index delta of 1. Similarly, there would be no need for a Δ−M1=−1 when M0=0. In order to report identified modulation orders for such two modulation orders, using the first operational mode, there would be 10 jointly-encoded values, which may be represented in approximately 3.32 bits ((log2(10)) bits ~3.32 bits).

For three modulation orders to be reported, using the first operational mode, each of M0, M1, and M2 are jointly-encoded, again, assuming a fixed index delta of 1, in which the index difference between modulation orders for any of the layers is no more than 1. This would result in 22 possible combinations, as shown in Table 2, below. 22 possible combination would use approximately 4.45 bits to represent in signaling (log2(22) bits ~4.45 bits).

It should be noted that if each layer in such a three modulation order/three layer system would be encoded separately for each layer, 2-bits per layer would be used for a total of 6 bits.

TABLE 2

| M0 | 0 | 0 | 0 | 0 | 1 | 1 | 1 | 1 | 1 | 1 | 1 | 2 |
|---|---|---|---|---|---|---|---|---|---|---|---|---|
| M1 | 0 | 0 | 1 | 1 | 0 | 0 | 1 | 1 | 1 | 2 | 2 | 1 |
| M2 | 0 | 1 | 0 | 1 | 0 | 1 | 0 | 1 | 2 | 1 | 2 | 1 |
| M0$_{(cnt)}$ | 2 | 2 | 2 | 2 | 2 | 2 | 3 | 3 | 3 | 3 | | |
| M1$_{(cnt)}$ | 1 | 2 | 2 | 2 | 3 | 3 | 2 | 2 | 3 | 3 | | |
| M2$_{(cnt)}$ | 2 | 1 | 2 | 3 | 2 | 3 | 2 | 3 | 2 | 3 | | |

Similarly, with four modulation orders, the feedback of per-layer modulation parameters may be jointly-encode assuming the same fixed index delta of 1. This would result to 46 possible combinations, shown in Table 3 below, which may be signaled using approximately 5.52 bits ((log2(46)

bits ~5.52 bits)), which if encoding each layer separately, 2 bits per layer would be used for a result of 8 bits.

TABLE 3

| M0 | 0 | 0 | 0 | 0 | 0 | 0 | 0 | 0 | 1 | 1 | 1 | 1 | 1 | 1 | 1 | 1 | 1 | 1 | 1 | 1 | 1 | 2 |
|---|---|---|---|---|---|---|---|---|---|---|---|---|---|---|---|---|---|---|---|---|---|---|
| M1 | 0 | 0 | 0 | 0 | 1 | 1 | 1 | 1 | 0 | 0 | 0 | 0 | 1 | 1 | 1 | 1 | 1 | 1 | 2 | 2 | 2 | 2 |
| M2 | 0 | 0 | 1 | 1 | 0 | 0 | 1 | 1 | 0 | 0 | 1 | 1 | 0 | 0 | 1 | 1 | 1 | 2 | 2 | 1 | 1 | 2 | 2 |
| M3 | 0 | 1 | 0 | 1 | 0 | 1 | 0 | 1 | 0 | 1 | 0 | 1 | 0 | 1 | 0 | 1 | 2 | 1 | 2 | 1 | 2 | 1 | 2 |
| M0$_{(cnt)}$ | 2 | 2 | 2 | 2 | 2 | 2 | 2 | 2 | 2 | 2 | 2 | 2 | 2 | 2 | 3 | 3 | 3 | 3 | 3 | 3 | 3 | 3 |
| M1$_{(cnt)}$ | 1 | 1 | 1 | 1 | 2 | 2 | 2 | 2 | 2 | 2 | 2 | 3 | 3 | 3 | 3 | 2 | 2 | 2 | 2 | 3 | 3 | 3 |
| M2$_{(cnt)}$ | 1 | 1 | 2 | 2 | 3 | 3 | 2 | 2 | 3 | 3 | 2 | 2 | 3 | 3 | 2 | 2 | 3 | 3 | 2 | 2 | 3 | 3 |
| M3$_{(cnt)}$ | 1 | 2 | 1 | 2 | 1 | 2 | 2 | 3 | 2 | 3 | 2 | 3 | 2 | 3 | 2 | 3 | 2 | 3 | 2 | 3 | 2 | 3 |

It should be noted that example aspects may include transmission of two codewords, where each of the codewords is transmitted with per-layer modulation, where feedback of preferred per-layer modulation orders may be jointly encoded according to the compression mechanisms described herein. For example, if the first codeword is mapped to 2 layers and the second codeword is mapped to 2 more layers, then the indices M0-M3 shown, for example, in Table 3 may be used according to any of the operational modes and functionalities described herein. If each codeword uses 4 layers, then there would be per-layer modulation orders of M0-M7.

In a second operational mode, instead of reporting the actual identified per-layer modulation order that is preferred, a relational parameter may be reported as the difference between identified modulation orders. With a relational parameter, the receiver would use additional information in order to deduce which modulation order was identified. For example, an ordering of the layers according to signal strength may be agreed to between the transmitter and receiver. The transmitter and receiver may agree on the ordering of the antenna ports/layers based average signal strength. Such an agreement on the ordering may occur independently with a different mechanism/signaling, etc. For example, the transmitter and receiver may agree on the ordering based on explicit or implicit signaling. The implicit signaling may concern the average signal strength of each of the scheduled layers. Such explicit or implicit signaling may be dynamic or semi-static. The agreement means that for any given layer, $M_i - M_{i+1} \geq 0$. In other words, $M_i$ is at least as good (and, therefore, has an equal or higher modulation order index) to $M_{i+1}$. Since $M_i - M_{i+1} \geq 0$, all allowed combinations are limited. The transmitter may signal only those, or the difference between the pairwise consecutive modulations, that meet the fixed index delta.

It should be noted that that in the described example, combinations are not removed, except those that do not satisfy the $M_i - M_{i+1} \geq 0$, constraint.

The agreed ordering along with an average CQI sent from the transmitter would allow the receiver to identified the modulation order preferred for each layer. With the known ordering, the transmitter may quantize and report the average CQI, along with the relative difference of the modulation orders, bounded again by a fixed index delta. For purposes of the described example, the fixed index delta may again be 1. In this example instance, any $M_i - M_{i+1} = \{-1, 0, 1\}$, for i=0, 1, 2. The possible combinations for 3 layers/modulation orders are shown in Table 4 below.

TABLE 4

| M0-M1 | -1 | -1 | -1 | 0 | 0 | 0 | 1 | 1 | 1 |
|---|---|---|---|---|---|---|---|---|---|
| M1-M2 | -1 | 0 | 1 | -1 | 0 | 1 | -1 | 0 | 1 |

In order to represent the pairwise differences of 4 layers/modulation orders: 3*3*3=27 values are used, resulting in approximately 4.75 bits for signaling. The possible values for 4 layers/modulation orders in the second operational mode are shown in Table 5 below. For representing pairwise differences of 3 layers/modulation orders of 3*3=9 values are used, resulting in approximately 3.16 bits for signaling. There would still be bits used for the quantization of the average CQI. It should be noted that an average CQI can be reported also in the previous compression mode.

TABLE 5

| M0-M1 | -1 | -1 | -1 | -1 | -1 | -1 | -1 | -1 | -1 | 0 | 0 | 0 |
|---|---|---|---|---|---|---|---|---|---|---|---|---|
| M1-M2 | -1 | -1 | -1 | 0 | 0 | 0 | 1 | 1 | 1 | -1 | -1 | -1 |
| M2-M3 | -1 | 0 | 1 | -1 | 0 | 1 | -1 | 0 | 1 | -1 | 0 | 1 |
| M0-M1$_{(cnt)}$ | 0 | 0 | 0 | 0 | 0 | 0 | 1 | 1 | 1 | 1 | 1 | 1 | 1 | 1 | 1 |
| M1-M2$_{(cnt)}$ | 0 | 0 | 0 | 1 | 1 | 1 | -1 | -1 | -1 | 0 | 0 | 0 | 1 | 1 | 1 |
| M2-M3$_{(cnt)}$ | -1 | 0 | 1 | -1 | 0 | 1 | -1 | 0 | 1 | -1 | 0 | 1 | -1 | 0 | 1 |

In this second operational mode, since the layer ordering is correct and known by both transmitter and receiver, any $M_i - M_{i+1} = \{0, 1\}$. Thus, it can be observed that fewer bits are needed to signal the modulation order difference, (e.g., just 1 bit per pairwise difference, for a total of 3 bits for the 4 layer scenario), as the layer/modulation ordering is already known.

Figure 7:
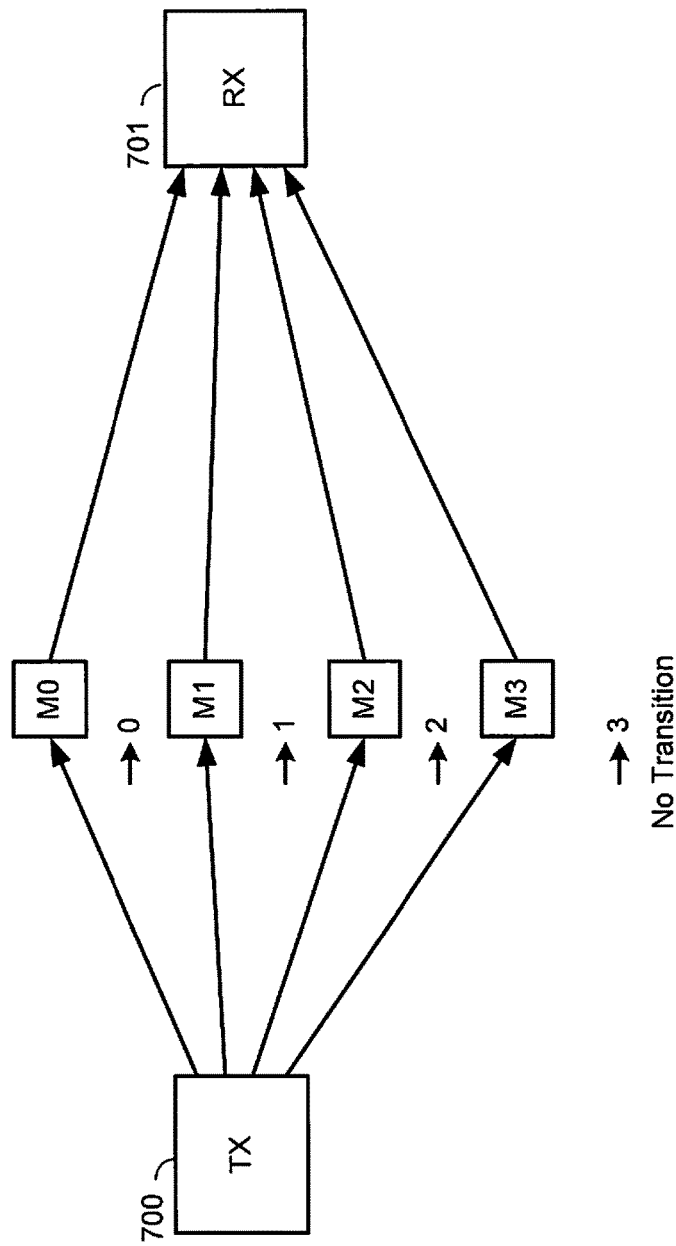
FIG. 7 is a block diagram illustrating a transmitter and a receiver configured according to one aspect of the present disclosure.

FIG. 7 is a block diagram illustrating a transmitter 700 and a receiver 701 configured according to one aspect of the present disclosure. In the illustrated example aspect, a third operation mode provides for a different relational parameter that may be reported for identifying the per-layer modulation order signaling. As in the second operational mode, the layer ordering based on the average signal strength is also known and agreed to between transmitter 700 and receiver 701. Such an agreement on the ordering is independent from the modulation order signaling, and means that $M_i - M_{i+1} \geq 0$, such that $M_i$ is at least as good as $M_{i+1}$.

According to the aspect of the third operational mode, only a single per-layer modulation order transition is allowed across the scheduled layers M0-M3. For example, the agreed ordering according to the average signal strength is known by transmitter 700 and receiver 701 to be: M0≥M1≥M2≥M3. Because the third operational mode limits the number of transitions to different per-layer modulation orders to one, a transition in the modulation order between transmitter 700 and receiver 701 can be either at position 0, between M0 and M1, at position 1 between M1 and M2, at position 2 between M2 and M3, or indication no switch at all by position 3. Accordingly, there are four potential locations in the present example with 4 layers/modulation order, which will use 2 bits of signaling.

For UEs that do not support per-layer modulation for codeword transmission, such UEs will only feedback the indices of the matrices presented above that correspond to equal modulation per layer (e.g., where the index difference is 0). For example, UE 115 (FIG. 6) may not include per-layer modulation selection logic 601, fixed index delta 602, and per-layer modulation parameters 603. In such an instance, UE 115 would only send modulation schemes that are equal across all scheduled layers.

Similarly, if the UE supports per-layer modulation, but not the network, the network may signal the UE not to feedback the per-layer modulation parameters. Thus, UE 115 would receive a notification from gNB 105 that it does not support per-layer modulation for codeword transmission. In response,, the execution environment of per-layer modulation selection logic 601 would essentially feedback only the values of the tables shown above that correspond to equal modulation per layer (index difference=0).

In a further example aspect of the present disclosure, a UE may select to switch between the per-layer modulation and equal-modulation modes semi-statically, or using MAC CE, or dynamically. UE 115, under control of controller/processor 280, executes modulation mode logic 604. The execution environment of modulation mode logic 604 monitors for various conditions at UE 115 that may determine whether UE 115 will switch from per-layer modulation to equal modulation for codeword transmission. For example, when there is limited feedback in the uplink, UE 115, through modulation mode logic 604, may elect to change the uplink control information (UCI) format to not support per-layer-modulation. Thus, whenever the uplink capacity may be limited, the switch from per-layer to equal modulation may happen automatically or triggered by UE 115. Moreover, if UE 115 determines, via modulation mode logic 604, that the maximum rank is 1 or 2, the UCI format would supports only "equal-modulation" mode, since the number of available layers would be limited anyway. Thus, where UE 115 experiences instances of low geometries and/or high mobility, it may switch itself from using the per-layer modulation scheme to the equal modulation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    identifying, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers; and
    transmitting, by the transmitter, per-layer modulation parameters to a receiver based on the preferred per-layer modulation order identified for each layer of the plurality of layers.

2. The method of claim 1, wherein the per-layer modulation parameters include:
    the preferred per-layer modulation order identified for each layer of the plurality of layers.

3. The method of claim 1, further including:
    determining, at the transmitter, an order of the plurality of layers, wherein the order is according to an average signal strength; and
    transmitting, by the transmitter to the receiver, an average channel quality indicator averaged over the plurality of layers.

4. The method of claim 3, wherein the per-layer modulation parameters include:
    a relative index difference between the preferred per-layer modulation order of each two consecutive layers of the plurality of layers.

5. The method of claim 3,
    wherein the preferred per-layer modulation order selected over the plurality of layers is permitted to change at most one time over the plurality of layers, and
    wherein the per-layer modulation parameters include a transition parameter, wherein the transition parameter identifies zero or more locations over the plurality of layers that the preferred per-layer modulation order changes from a first preferred per-layer modulation order to a next preferred per-layer modulation order.

6. The method of claim 1, further including:
    receiving, at the transmitter from the receiver, an indication that the receiver is incapable of receiving per-layer modulation transmissions;
    in response to the indication, refraining, by the transmitter, from performing the identifying and the transmitting; and
    transmitting, by the transmitter, equal modulation parameters for the plurality of layers.

7. The method of claim 1, further including:
    detecting, by the transmitter, transition conditions at the transmitter;
    in response to the transition conditions, refraining, by the transmitter, from performing the identifying and the transmitting; and
    transmitting, by the transmitter, equal modulation parameters for the plurality of layers.

8. The method of claim 1, further including:
    receiving, at the transmitter, an assigned per-layer modulation order from the receiver for each layer of the plurality of layers, wherein the assigned per-layer modulation order is in consideration by the receiver of the per-layer modulation parameters, and wherein the per-layer modulation parameters are transmitted by the transmitter along with additional channel state information for the receiver; and
    transmitting, by the transmitter, all bits associated with the codeword modulated onto each of the plurality of layers according to the assigned per-layer modulation order for the each layer.

9. An apparatus configured for wireless communication, comprising:
    means for identifying, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers; and
    means for transmitting, by the transmitter, per-layer modulation parameters to a receiver based on the preferred per-layer modulation order identified for each layer of the plurality of layers.

10. The apparatus of claim 9, wherein the per-layer modulation parameters include:
    the preferred per-layer modulation order identified for each layer of the plurality of layers.

11. The apparatus of claim 9, further including:
    means for determining, at the transmitter, an order of the plurality of layers, wherein the order is according to an average signal strength; and means for transmitting, by the transmitter to the receiver, an average channel quality indicator averaged over the plurality of layers.

12. The apparatus of claim 11, wherein the per-layer modulation parameters include:
a relative index difference between the preferred per-layer modulation order of each two consecutive layers of the plurality of layers.

13. The apparatus of claim 11,
wherein the preferred per-layer modulation order selected over the plurality of layers is permitted to change at most one time over the plurality of layers, and
wherein the per-layer modulation parameters include a transition parameter, wherein the transition parameter identifies zero or more locations over the plurality of layers that the preferred per-layer modulation order changes from a first preferred per-layer modulation order to a next preferred per-layer modulation order.

14. The apparatus of claim 9, further including:
means for receiving, at the transmitter from the receiver, an indication that the receiver is incapable of receiving per-layer modulation transmissions;
means for refraining, by the transmitter, from performing the means for identifying and the means for transmitting in response to the indication; and
means for transmitting, by the transmitter, equal modulation parameters for the plurality of layers.

15. The apparatus of claim 9, further including:
means for detecting, by the transmitter, transition conditions at the transmitter;
means for refraining, by the transmitter, from means for performing the means for identifying and the means for transmitting in response to the transition conditions; and
means for transmitting, by the transmitter, equal modulation parameters for the plurality of layers.

16. The apparatus of claim 9, further including:
means for receiving, at the transmitter, an assigned per-layer modulation order from the receiver for each layer of the plurality of layers, wherein the assigned per-layer modulation order is in consideration by the receiver of the per-layer modulation parameters, and wherein the per-layer modulation parameters are transmitted by the transmitter along with additional channel state information for the receiver; and
means for transmitting, by the transmitter, all bits associated with the codeword modulated onto each of the plurality of layers according to the assigned per-layer modulation order for the each layer.

17. A non-transitory computer-readable medium having program code recorded thereon, the program code comprising:
program code executable by a computer for causing the computer to identify, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers; and
program code executable by the computer for causing the computer to transmit, by the transmitter, per-layer modulation parameters to a receiver based on the preferred per-layer modulation order identified for each layer of the plurality of layers.

18. The non-transitory computer-readable medium of claim 17, wherein the per-layer modulation parameters include:
the preferred per-layer modulation order identified for each layer of the plurality of layers.

19. The non-transitory computer-readable medium of claim 17, further including:
program code executable by the computer for causing the computer to determine, at the transmitter, an order of the plurality of layers, wherein the order is according to an average signal strength; and
program code executable by the computer for causing the computer to transmit, by the transmitter to the receiver, an average channel quality indicator averaged over the plurality of layers.

20. The non-transitory computer-readable medium of claim 17, further including:
program code executable by the computer for causing the computer to receive, at the transmitter from the receiver, an indication that the receiver is incapable of receiving per-layer modulation transmissions;
program code executable by the computer, in response to the indication, for causing the computer to refrain, by the transmitter, from executing the program code executable by the computer for causing the computer to identify and the program code executable by the computer for causing the computer to transmit; and
program code executable by the computer for causing the computer to transmit, by the transmitter, equal modulation parameters for the plurality of layers.

21. The non-transitory computer-readable medium of claim 17, further including:
program code executable by the computer for causing the computer to detect, by the transmitter, transition conditions at the transmitter;
program code executable by the computer, in response to the transition conditions, for causing the computer to refrain, by the transmitter, from executing the program code executable by the computer for causing the computer to identify and the program code executable by the computer for causing the computer to transmit; and
program code executable by the computer for causing the computer to transmit, by the transmitter, equal modulation parameters for the plurality of layers.

22. The non-transitory computer-readable medium of claim 17, further including:
program code executable by the computer for causing the computer to receive, at the transmitter, an assigned per-layer modulation order from the receiver for each layer of the plurality of layers, wherein the assigned per-layer modulation order is in consideration by the receiver of the per-layer modulation parameters, and wherein the per-layer modulation parameters are transmitted by the transmitter along with additional channel state information for the receiver; and
program code executable by the computer for causing the computer to transmit, by the transmitter, all bits associated with the codeword modulated onto each of the plurality of layers according to the assigned per-layer modulation order for the each layer.

23. An apparatus configured for wireless communication, the apparatus comprising:
at least one processor; and
a memory coupled to the at least one processor,
wherein the at least one processor is configured:
to identify, at a transmitter, a preferred per-layer modulation order from a plurality of indexed modulation orders for each layer of a plurality of layers scheduled for transmission of a codeword, wherein the preferred per-layer modulation order identified for any one of the plurality of layers is within a fixed index delta of the preferred per-layer modulation order of any other of the plurality of layers; and to transmit, by the transmitter, per-layer modulation parameters to a receiver based on the preferred per-layer modulation order identified for each layer of the plurality of layers.

24. The apparatus of claim 23, wherein the per-layer modulation parameters include:

the preferred per-layer modulation order identified for each layer of the plurality of layers.

25. The apparatus of claim 23 further including the transmitter, and further including configuration of the at least one processor:

to determine, at the transmitter, an order of the plurality of layers, wherein the order is according to an average signal strength; and to transmit, by the transmitter to the receiver, an average channel quality indicator averaged over the plurality of layers.

26. The apparatus of claim 25, wherein the per-layer modulation parameters include:

a relative index difference between the preferred per-layer modulation order of each two consecutive layers of the plurality of layers.

27. The apparatus of claim 25, wherein the preferred per-layer modulation order selected over the plurality of layers is permitted to change at most one time over the plurality of layers, and wherein the per-layer modulation parameters include a transition parameter, wherein the transition parameter identifies zero or more locations over the plurality of layers that the preferred per-layer modulation order changes from a first preferred per-layer modulation order to a next preferred per-layer modulation order.

28. The apparatus of claim 23, further including configuration of the at least one processor:

to receive, at the transmitter from the receiver, an indication that the receiver is incapable of receiving per-layer modulation transmissions;

to refrain, by the transmitter in response to the indication, from executing the configuration of the at least one processor to identify and the configuration of the at least one processor to transmit; and to transmit, by the transmitter, equal modulation parameters for the plurality of layers.

29. The apparatus of claim 23, further including configuration of the at least one processor:

to detect, by the transmitter, transition conditions at the transmitter;

to refrain, by the transmitter, in response to the transition conditions, from executing the configuration of the at least one processor to identify and the configuration of the at least one processor to transmit; and to transmit, by the transmitter, equal modulation parameters for the plurality of layers.

30. The apparatus of claim 23, further including configuration of the at least one processor:

to receive, at the transmitter, an assigned per-layer modulation order from the receiver for each layer of the plurality of layers, wherein the assigned per-layer modulation order is in consideration by the receiver of the per-layer modulation parameters, and wherein the per-layer modulation parameters are transmitted by the transmitter along with additional channel state information for the receiver; and to transmit, by the transmitter, all bits associated with the codeword modulated onto each of the plurality of layers according to the assigned per-layer modulation order for the each layer.

* * * * *